(12) United States Patent
Jung

(10) Patent No.: US 8,438,733 B2
(45) Date of Patent: May 14, 2013

(54) METHOD OF MANUFACTURING COIL SPRING USING HELICOID REDUCTION MILL

(75) Inventor: Chan-Gi Jung, Incheon (KR)

(73) Assignee: Dae Won Kang Up Co., Ltd. (KR)

( * ) Notice: Subject to any disclaimer, the term of this patent is extended or adjusted under 35 U.S.C. 154(b) by 0 days.

(21) Appl. No.: 12/937,817

(22) PCT Filed: Jun. 4, 2009

(86) PCT No.: PCT/KR2009/002993
§ 371 (c)(1), (2), (4) Date: Oct. 14, 2010

(87) PCT Pub. No.: WO2010/134657
PCT Pub. Date: Nov. 25, 2010

(65) Prior Publication Data
US 2012/0047741 A1    Mar. 1, 2012

(30) Foreign Application Priority Data
May 19, 2009 (KR) .......... 10-2009-0043511

(51) Int. Cl.
*B21F 35/00* (2006.01)
(52) U.S. Cl.
USPC .......... 29/896.91; 29/896.93; 72/135
(58) Field of Classification Search .......... 29/90.7, 29/407.05, 896.91, 896.9; 72/53, 95, 98, 72/127, 135; 148/580, 908
See application file for complete search history.

(56) References Cited

U.S. PATENT DOCUMENTS
2,219,376 A * 10/1940 Young et al. .......... 219/153
(Continued)

FOREIGN PATENT DOCUMENTS
JP  5-23772  2/1993
JP  8-1267   1/1996
(Continued)

OTHER PUBLICATIONS
International Search Report—PCT/KR2009/002993 dated May 12, 2010.
(Continued)

*Primary Examiner* — David Bryant
*Assistant Examiner* — Ruth G Hidalgo-Hernandez
(74) *Attorney, Agent, or Firm* — Cantor Colburn LLP

(57) ABSTRACT

A method of manufacturing a coil spring using a helicoid reduction mill includes supplying a coil spring material linearly unrolled by a prestraightener to a surface treatment machine and then short-blasting or scarfing its outer surface to surface-treat the coil spring material; primarily heating the surface-treated coil spring material to a predetermined temperature using a first heater; sequentially supplying and pressurizing the primarily-heated coil spring material in a stepwise fashion such that the coil spring material has the same diameter as that of a coil spring to be manufactured; measuring the diameter and the length of the coil spring material and then cutting the coil spring material to a desired size; secondarily heating the cut coil spring material to a predetermined temperature using a second heater; forming the secondarily heated coil spring material into a coil spring using a coiling machine; and oil-quenching and then tempering the formed coil spring.

5 Claims, 2 Drawing Sheets

U.S. PATENT DOCUMENTS

| | | | | |
|---|---|---|---|---|
| 4,112,721 | A | * | 9/1978 | Takase et al. .................. 72/18.6 |
| 4,705,580 | A | * | 11/1987 | Yamazaki ..................... 148/568 |
| 4,938,811 | A | * | 7/1990 | Murai et al. .................. 148/595 |
| 5,001,916 | A | * | 3/1991 | Schuler et al. ..................... 72/96 |
| 5,277,048 | A | * | 1/1994 | Lubas ............................... 72/53 |
| 5,761,943 | A | * | 6/1998 | Blasius ........................... 72/132 |
| 6,022,427 | A | * | 2/2000 | Wienand et al. ............. 148/580 |
| 6,035,686 | A | * | 3/2000 | Muhr et al. ..................... 72/240 |
| 2004/0060619 | A1 | * | 4/2004 | Sakata et al. .................. 148/568 |
| 2006/0150384 | A1 | * | 7/2006 | Labonte et al. ............ 29/407.01 |
| 2007/0074792 | A1 | * | 4/2007 | Vondracek et al. ........... 148/580 |
| 2008/0302157 | A1 | * | 12/2008 | Kleckner et al. ................ 72/144 |

FOREIGN PATENT DOCUMENTS

| | | |
|---|---|---|
| JP | 08001267 | 1/1996 |
| JP | 11169991 | 6/1999 |
| JP | 2006524573 | 11/2006 |
| KR | 10-2001-0097985 | 11/2001 |
| KR | 10-2002-0019737 | 3/2002 |

OTHER PUBLICATIONS

Written Opinion—PCT/KR2009/002993 dated May 12, 2010.

* cited by examiner

METHOD OF MANUFACTURING COIL SPRING USING HELICOID REDUCTION MILL

TECHNICAL FIELD

The present invention relates to a method of manufacturing a coil spring using a helicoid reduction mill, and, more particularly, to a method of manufacturing a coil spring using a helicoid reduction mill, which can greatly decrease the weight of a coil spring at the time of manufacturing a coil spring requiring uniform strength, which can manufacture a coil spring in an environment-friendly manner, and which can manufacture spring coils having various material diameters using one coil spring material.

BACKGROUND ART

Hereinafter, the background art and its problems will be described.

Generally, a method of manufacturing a coil spring largely includes a cold spring coil manufacturing method and a hot spring coil manufacturing method.

In the cold coil spring manufacturing method, a purchased oil-tempered wire or induction-treated wire having a desired material diameter is coiled in the form of a coil spring using a cold coiling machine to manufacture a coil spring. In the hot coil spring manufacturing method, a wire rolled in a material processing factory or a rod-shape material is processed into a coil spring material having a diameter and length required for a coil spring, and then the coil spring material is heated to a predetermined temperature in a heating furnace, coiled in the form of a coil spring using a coiling machine, quenched and then tempered to manufacture a coil spring.

The hot coil spring manufacturing method is described in more detail as follows.

Generally, in order to manufacture a coil spring through the hot coil spring manufacturing method, first, a coil spring material is linearized to have a diameter identical with the material diameter of a coil spring to be manufactured, and then the linearized coil spring material is cut to a desired length through a material processing process and then heated to a temperature of 950-1000° C. in a heating furnace, and then the heated coil spring material is coiled in the form of a coil spring using a coiling machine, quenched and then tempered to manufacture a coil spring.

However, the above conventional hot coil spring manufacturing method is problematic in that coil spring materials having the same material diameters as those of coil springs to be manufactured must be respectively prepared in order to manufacture coil springs having various material diameters, and in that environment-friendly coil springs cannot be manufactured because fossil fuels are generally used in a heating furnace.

Further, the above conventional hot coil spring manufacturing method is problematic in that it takes a lot of time to pass a spring coil material through a heating furnace until the spring coil material is heated, so that the spring coil material is decarbonized and is formed on the surface thereof with an oxide film, thereby exerting a negative influence on coil spring quality.

Meanwhile, recently, since coil springs are strongly required to be light in order to reduce the fuel consumption rate of automobiles, high-stress coil spring materials containing high-priced special metals have been developed. However, there are also problems in that the production cost of a coil spring is increased, and thus it is also very difficult to decrease the fuel consumption rate of automobiles through the decrease in weight of the automobile.

DISCLOSURE

Technical Problem

Accordingly, the present invention has been made keeping in mind the above problems occurring in the prior art, and an object of the present invention is to provide a method of manufacturing a spring coil using a helicoid reduction mill, in which a wire shipped from a steel-making plant is further hot-rolled and simultaneously formed into a coil spring within several seconds, and thus the tensile strength of the formed spring coil becomes higher due to an ausforming effect occurring at the time of quenching special steel, and in which an austenite structure can be safely maintained at room temperature and can also be highly densified to obtain a high-stress product, so that the fatigue life of a coil spring can be increased, with the result that the length of a coil spring material can be greatly decreased at the time of manufacturing a coil spring requiring uniform strength, thereby decreasing the weight of a coil spring.

Another object of the present invention is to provide a method of manufacturing a coil spring using a helicoid reduction mill, which can manufacture spring coils having various material diameters using one coil spring material.

Still another object of the present invention is to provide a method of manufacturing a coil spring using a helicoid reduction mill, which can further increase fatigue life, which is a core factor in quality of a coil spring, by densifying the metal texture of a left-twisted or right-twisted coil spring in a stress direction, and which can solve the problems with roundness, straightness and surface defect of a coil spring material occurring in a general rolling process.

Technical Solution

In order to accomplish the above objects, the present invention provides a method of manufacturing a coil spring using a helicoid reduction mill, including the steps of: supplying a coil spring material linearly unrolled by a pre-straightener to a surface treatment machine and then shot-blasting or scarfing its outer surface to surface-treat the coil spring material; primarily heating the surface-treated coil spring material to a predetermined temperature using a first heater; sequentially supplying the primarily-heated coil spring material between upper and lower rollers of a plurality of helicoid reduction mills and then pressurizing it in a stepwise fashion so as to reduce a cross-section of the coil spring material such that the coil spring material has the same diameter as that of a coil spring to be manufactured; measuring the diameter of the coil spring material using a diameter measuring machine, measuring the length of the coil spring material using a length measuring machine and then cutting the coil spring material to a desired size; secondarily heating the cut coil spring material to a predetermined temperature using a second heater such that a temperature drop of the coil spring material cooled through the cross-section reducing process and the coiling spring material cutting process is compensated for; forming the secondarily heated coil spring material into a coil spring using a coiling machine; and oil-quenching and then tempering the formed coil spring.

Advantageous Effects

As described above, the method of manufacturing a coil spring using a helicoid reduction mill according to the present invention is advantageous in that a coil spring material, which is a wire shipped from a steel-making plant, is further hot-rolled and simultaneously formed into a coil spring within several seconds, and thus a coil spring having higher tensile strength can be manufactured due to an ausforming effect occurring at the time of quenching special steel.

Further, the method of manufacturing a coil spring using a helicoid reduction mill according to the present invention is advantageous in that A3 transformation in special steel containing Ni, Cr, Mn and the like in addition to carbon (C) can be easily prevented, an austenite structure (γ solid solution, face-centered cubic lattice) can be safely maintained at room temperature, and the diameter of a coil spring material can be adjusted to the diameter identical with the material diameter of a coil spring to be manufactured by sequentially pressurizing the coil spring material while rotating it clockwise or counterclockwise according to the coiling direction of a coil spring through a progressive helicoid hot rolling process using a helicoid reduction mill so as to decrease the cross-section of the coil spring material, so that the austenite structure (γ solid solution, face-centered cubic lattice) of a left-twisted or right-twisted coil spring can be highly densified in a stress direction to obtain a high-stress product, the fatigue life, which is a core factor in quality of a coil spring, can be further increased, and the problems with roundness, straightness and surface defect of a coil spring material occurring in a general rolling process can be solved.

Therefore, the method of manufacturing a coil spring using a helicoid reduction mill according to the present invention is also advantageous in that, since the winding number of a coil spring can be greatly decreased at the time of manufacturing a coil spring requiring uniform strength, the amount of a coil spring material is also greatly decreased, so that a light coil spring can be manufactured, with the result that the weight of a vehicle can also be decreased when the manufactured coil spring is used for a vehicle suspension system, thereby decreasing the fuel consumption rate of automobiles.

Further, the method of manufacturing a coil spring using a helicoid reduction mill according to the present invention is advantageous in that, since the diameter of a coil spring material is adjusted by a helicoid reduction mill, coil springs having various material diameters can be manufactured using one coil spring material, so that it is not required to alternate coil spring materials according to desired material diameters, with the result that coil springs having desired material diameters can be rapidly and easily manufactured.

Furthermore, the method of manufacturing a coil spring using a helicoid reduction mill according to the present invention is advantageous in that a coil spring material can be heated to a desired temperature within several seconds using first and second induction heaters instead of a heating furnace, and thus a coil spring can be manufactured in an environment-friendly manner without using fossil fuels, and in that high quality coil springs can be manufactured because the surfaces of coil spring materials having desired material diameters are not decarbonized and oxidized and the lengths thereof are not changed when they are heated using the first and second induction heaters.

DESCRIPTION OF DRAWINGS

The above and other objects, features and advantages of the present invention will be more clearly understood from the following detailed description taken in conjunction with the accompanying drawings, in which.

BEST MODE

Hereinafter, preferred embodiments of the present invention will be described in detail with reference to the accompanying drawings.

Figure 1:
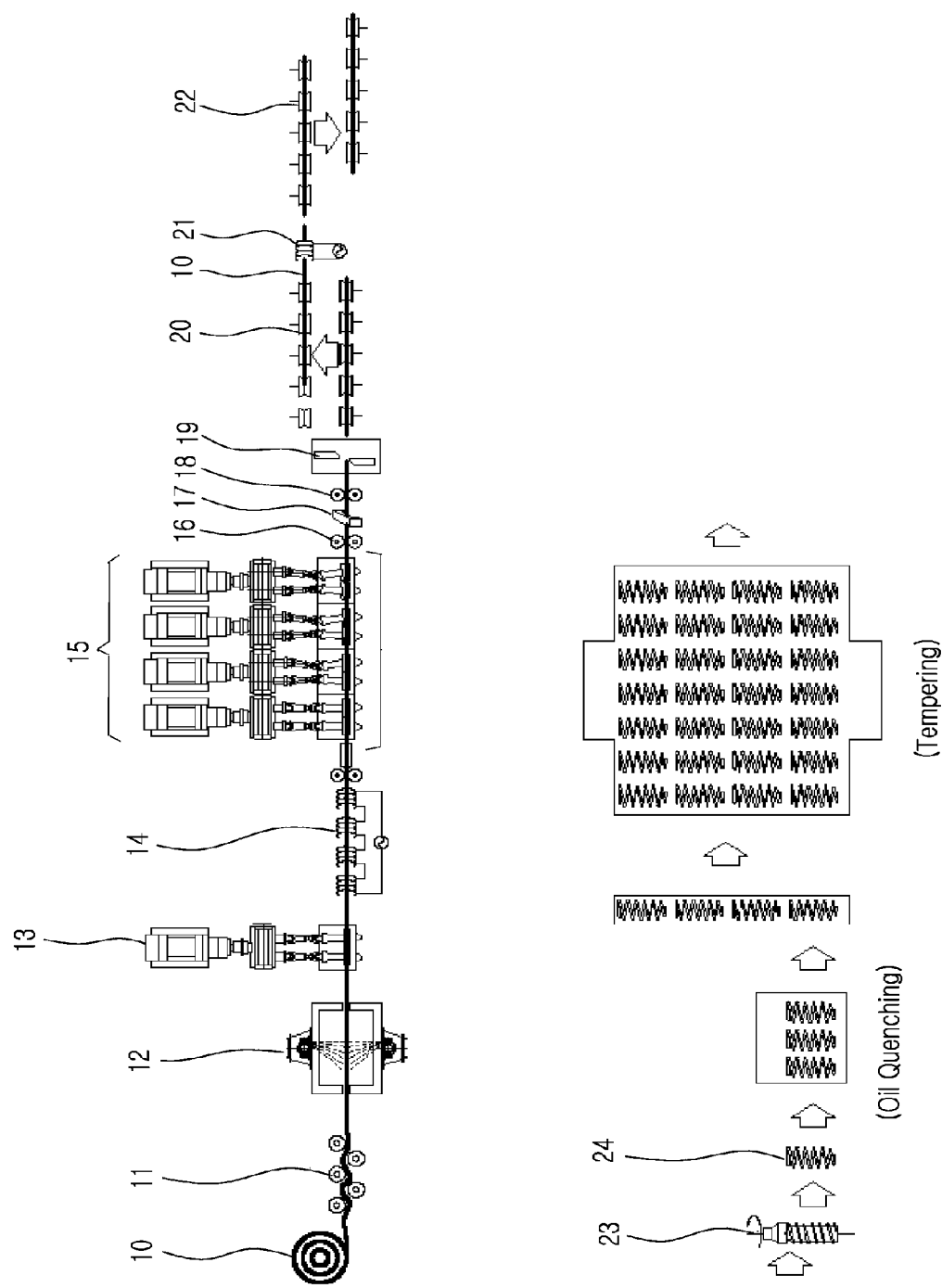
FIG. 1 is a view for explaining a process of manufacturing a coil spring according to a method of manufacturing a coil spring using a helicoid reduction mill of the present invention.
Figure 2:
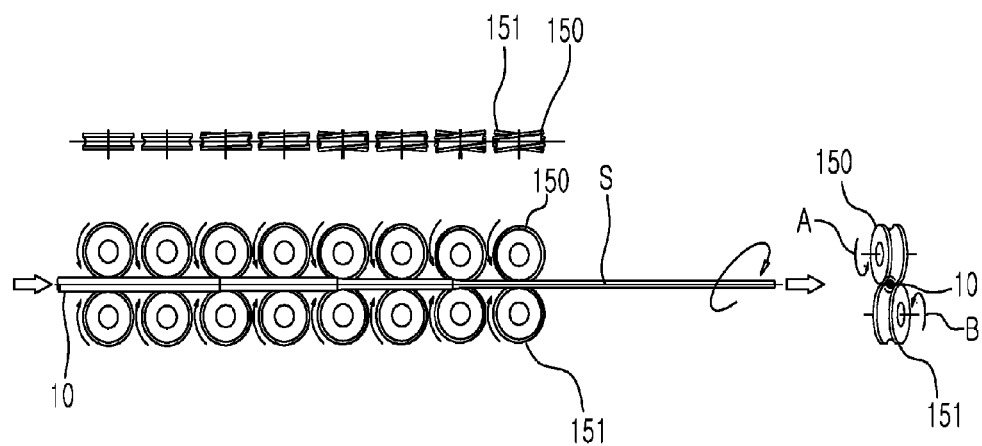
FIG. 2 is a view for explaining a process of pressurizing a coil spring material using a helicoid reduction mill at the time of manufacturing a right-twisted coil spring.
Figure 3:
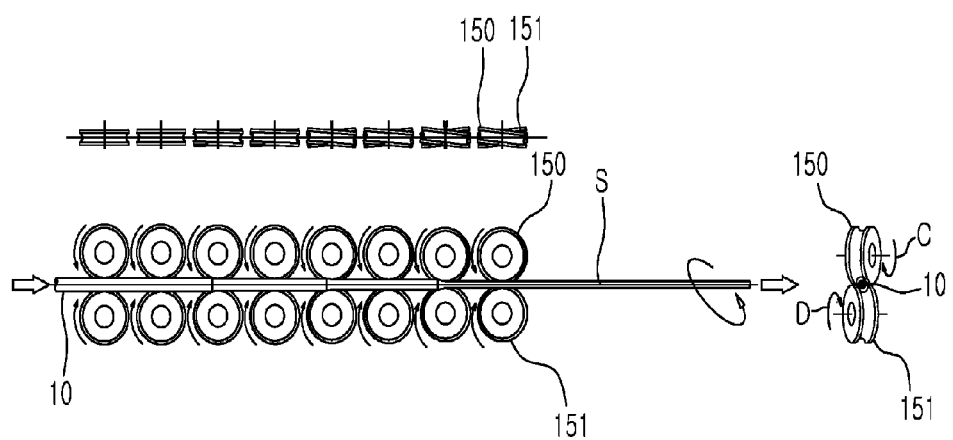
FIG. 3 is a view for explaining a process of pressurizing a coil spring material using a helicoid reduction mill at the time of manufacturing a left-twisted coil spring.

FIG. 1 is a view for explaining a process of manufacturing a coil spring according to a method of manufacturing a coil spring using a helicoid reduction mill of the present invention, FIG. 2 is a view for explaining a process of pressurizing a coil spring material using a helicoid reduction mill at the time of manufacturing a right-twisted coil spring, and FIG. 3 is a view for explaining a process of pressurizing a coil spring material using a helicoid reduction mill at the time of manufacturing a left-twisted coil spring.

The process of manufacturing a coil spring according to the method of manufacturing a coil spring using a helicoid reduction mill of the present invention is described with reference to FIGS. 1 to 3 as follows.

As shown in FIGS. 1 to 3, in order to manufacture a coil spring according to the method of manufacturing a coil spring using a helicoid reduction mill of the present invention, first, a coil spring material, which is a coiled wire shipped from a steel-making plant, is linearly unrolled by a pre-straightener 11.

The coil spring material 10 linearly unrolled by the pre-straightener 11 is supplied to a surface treatment machine 12, and then its outer surface is shot-blasted or scarfed by the surface treatment machine 12.

Subsequently, the surface-treated coil spring material 10 is tightened by an infeed roll 13, introduced into a first heater 14, and then heated to a temperature of $A_{C3}$ transformation point by the first heater 14, thereby causing the inner structure of the coil spring material 10 to be transformed into an austenite structure.

Subsequently, the coil spring material 10 primarily heated by the first heater 14 is sequentially supplied between upper and lower rollers 150 and 151 of a plurality of helicoid reduction mills, and sequentially pressurized by the upper and lower rollers 150 and 151 such that the material diameter of the coil spring material 10 is identical with that of a coil spring to be manufactured, thus adjusting the material diameter thereof.

Here, the upper and lower rollers 150 and 151 of the plurality of helicoid reduction mills are configured such that the angle defined between axes of the upper and lower rollers 150 and 151, which intersect each other in an X shape on the central axis (S) of the coil spring material 10, is gradually increased from one input end thereof through which the coil spring material 10 is supplied to the other output end thereof through which the coil spring material 10 is discharged. The coil spring material 10 is rotated based on the central axis (S) of the coil spring material 10, and is simultaneously rolled by the upper and lower rollers 150 and 151.

That is, when a right-twisted coil spring, which is coiled and weighed clockwise, is manufactured, the upper rollers 150 are configured such that they are rotated counterclockwise based on the central axis (S) of the coil spring material 10, and the lower rollers 151 are configured such that they are rotated clockwise based on the central axis (S) of the coil spring material 10, so that the upper and lower rollers 150 and 151 intersect each other in an X shape. Here, the coil spring material 10 is rotated clockwise based on the central axis (S) of the coil spring material 10, and is simultaneously pressurized using the helicoid reduction mills 15 provided with the upper and lower rollers 150 and 151, thus adjusting the material diameter thereof. When a left-twisted coil spring, which is coiled and weighed counterclockwise, is manufactured, the upper rollers 150 are configured such that they are rotated clockwise based on the central axis (S) of the coil spring material 10, and the lower rollers 151 are configured such that they are rotated counterclockwise based on the central axis (S) of the coil spring material 10, so that the upper and lower rollers 150 and 151 intersect each other in an X shape. Here, the coil spring material 10 is rotated counterclockwise based on the central axis (S) of the coil spring material 10, and is simultaneously pressurized using the helicoid reduction mills 15 provided with the upper and lower rollers 150 and 151, thus adjusting the material diameter thereof.

Processes for adjusting the diameter of a coil spring material will be described in more detail with reference to FIGS. 2 and 3.

As shown in FIG. 2, the upper rollers 150 are configured such that they are rotated counterclockwise based on the central axis (S) of the coil spring material 10, and the lower rollers 151 are configured such that they are rotated clockwise based on the central axis (S) of the coil spring material 10, so that the upper and lower rollers 150 and 151 intersect each other in an X shape. In this case, when the coil spring material 10 is introduced between the upper and lower rollers 150 and 151, the upper rollers 150 are rotated in the direction of arrow A, and the lower rollers 151 are rotated in the direction of arrow B, so that one upper side of the outer surface of the coil spring material 10 is pushed clockwise by one side of the upper rollers 150, and the other lower side of the outer surface of the coil spring material 10 is pushed clockwise by the other side of the lower rollers 151, with the result that the coil spring material is rotated clockwise and simultaneously pressurized by the upper and lower rollers 150 and 151, thereby decreasing the material diameter of the coil spring material. Further, the upper and lower rollers 150 and 151 of the plurality of helicoid reduction mills are configured such that the angle at which they intersect each other in an X shape on the central axis (S) of the coil spring material 10 is gradually increased from one end thereof to which the coil spring material 10 is supplied to the other end thereof from which the coil spring material 10 is discharged, so that the material diameter of the coil spring material 10 is decreased stepwise because the coil spring material 10 sequentially passes through the upper and lower rollers 150 and 151 of the plurality of helicoid reduction mills, thereby adjusting the material diameter thereof.

Further, as shown in FIG. 3, the upper rollers 150 are configured such that they are rotated clockwise based on the central axis (S) of the coil spring material 10, and the lower rollers 151 are configured such that they are rotated counterclockwise based on the central axis (S) of the coil spring material 10, so that the upper and lower rollers 150 and 151 intersect each other in an X shape. In this case, when the coil spring material 10 is introduced between the upper and lower rollers 150 and 151, the upper rollers 150 are rotated in the direction of arrow C, and the lower rollers 151 are rotated in the direction of arrow D, so that one upper side of the outer surface of the coil spring material 10 is pushed counterclockwise by one side of the upper rollers 150, and the other lower side of the outer surface of the coil spring material 10 is pushed counterclockwise by the other side of the lower rollers 151, with the result that the coil spring material is rotated counterclockwise and simultaneously pressurized by the upper and lower rollers 150 and 151, thereby decreasing the material diameter of the coil spring material. Further, the upper and lower rollers 150 and 151 of the plurality of helicoid reduction mills are configured such that the angle at which they intersect each other in an X shape on the central axis (S) of the coil spring material 10 is gradually increased from one end thereof to which the coil spring material 10 is supplied to the other end thereof from which the coil spring material 10 is discharged, so that the material diameter of the coil spring material 10 is decreased stepwise because the coil spring material 10 sequentially passes through the upper and lower rollers 150 and 151 of the plurality of helicoid reduction mills, thereby adjusting the material diameter thereof.

Generally, a right-twisted spring is coiled clockwise and thus weighed clockwise, and a left-twisted spring is coiled counterclockwise and thus weighed counterclockwise. In the method of manufacturing a coil spring using a helicoid reduction mill according to the present invention, when a right-twisted spring is manufactured, the coil spring material 10 is rotated in the clockwise direction in which a coil spring to be manufactured is weighed and simultaneously pressurized by the upper and lower rollers 150 and 151, thereby adjusting the material diameter of the coil spring material. When a left-twisted spring is manufactured, the coil spring material 10 is rotated in the counterclockwise direction in which a coil spring to be manufactured is weighed and simultaneously pressurized by the upper and lower rollers 150 and 151, thereby improving the strength of the coil spring material.

That is, when a coil spring 24 is weighed, the wire diameter section of the coil spring 24 is shear-stressed and torsion-stressed. In this case, a right-twisted coil spring is torsion-stressed clockwise, and a left-twisted coil spring is torsion-stressed counterclockwise. Therefore, in the rolling process for reducing the cross-section of a coil spring, a right-twisted coil spring is progressively helicoid-rolled clockwise, and a left-twisted coil spring is progressively helicoid-rolled counterclockwise, so that the metal texture of the right-twisted or left-twisted coil is further densified, with the result that the fatigue life, which is a core factor in quality of a coil spring, can be further increased, and the problems with roundness, straightness and surface defects of a coil spring material occurring in a general rolling process can be overcome.

Generally, since a coil spring is characterized in that its strength increases with an increase in its winding number, when the method of manufacturing a coil spring using a helicoid reduction mill according to the present invention is used to manufacture a coil spring having uniform strength, the winding number of the coil spring can be decreased, thus lightening the weight of the coil spring.

As described above, after the diameter of the coil spring material 10 is adjusted, the coil spring material 10 is supplied to a diameter measuring machine 17 by pinch rollers 16 to have the diameter of the coil spring material 10 measured by the diameter measuring machine 17, and then the length of the coil spring material 10 is measured by a length measuring machine 18, and then the coil spring material is cut to desired length using a cutting machine 19.

Subsequently, the cut coil spring material 10 is supplied to a second heater 21 by a conveyor 20. Here, since the cut coil spring material 10 supplied to the second heater 21 has been somewhat cooled through the diameter adjustment process and the coiling spring material cutting process, the coil spring material 10 is reheated by the second heater 21 such that the temperature drop of the coil spring material cooled through the diameter adjustment process and the coiling spring material cutting process is compensated for.

Subsequently, the cut coil spring material 10 reheated by the second heater 21 is transferred to a coiling machine 23 by a conveyor 22, and is then formed into a coil spring 24 by the coiling machine 23.

Then, the coil spring 24 formed by the coiling machine 23 is oil-quenched and then tempered to complete the manufacture of a coil spring of the present invention.

As described above, according to the method of manufacturing a coil spring using a helicoid reduction mill, the coil spring material 10 cooled through the diameter adjustment process and the coiling spring material cutting process is reheated by the second heater 21 to increase the temperature thereof to the same extent that it was decreased by, and then the reheated coil spring material 10 is coiled and then rapidly cooled through oil quenching to maintain an austenite structure at room temperature, thereby greatly increasing the strength of the coil spring 24.

Further, the method of manufacturing a coil spring using a helicoid reduction mill according to the present invention is advantageous in that the coil spring material 10 is heated to desired temperature within several seconds using the first and second induction heaters 14 and 21 instead of a heating furnace in which fossil fuels are used, so that harmful gases, such as carbon dioxide, carbon monoxide, sulfur dioxide and the like, are not generated, thereby manufacturing a coil spring 24 in an environment-friendly manner, and in that high quality coil springs can be manufactured because the surface of coil spring material having desired material diameters are not decarbonized and oxidized and the lengths thereof are not changed when they are heated using the first and second induction heaters.

Further, the method of manufacturing a coil spring using a helicoid reduction mill according to the present invention is advantageous in that, since the diameter of the coil spring material 10 is adjusted by the helicoid reduction mill 15, various coil spring materials may not be provided depending on the material diameters of coil springs to be manufactured.

Furthermore, the method of manufacturing a coil spring using a helicoid reduction mill according to the present invention is advantageous in that additional conveying work for heating coil spring materials 10 having desired diameters using a heating furnace and then conveying them to spring manufacture equipment is not required, and coil springs 24 having various material diameters can be manufactured using one coil spring material, so that it is not required to alternate coil spring materials according to desired material diameters, with the result that the manufacturing time of the coil springs can be decreased.

As described above, the method of manufacturing a coil spring using a helicoid reduction mill according to the present invention is advantageous in that a coil spring material 10, which is a wire shipped from a steel-making plant, is further hot-rolled and simultaneously formed into a coil spring 24 within several seconds, and thus a coil spring 24 having higher tensile strength can be manufactured due to an ausforming effect occurring at the time of quenching special steel, and in that A3 transformation in special steel containing Ni, Cr, Mn and the like in addition to carbon (C) can be easily prevented, an austenite structure (γ solid solution, face-centered cubic lattice) can be safely maintained at room temperature, and the diameter of a coil spring material 10 can be adjusted to have a diameter identical with the material diameter of a coil spring 24 to be manufactured by sequentially pressurizing the coil spring material 10 while rotating it clockwise or counterclockwise according to the coiling direction of a coil spring 24 through a progressive helicoid hot rolling process using a helicoid reduction mill so as to decrease the cross-section of the coil spring material 10, so that the austenite structure (γ solid solution, face-centered cubic lattice) of a coil spring 24 can be highly densified in a stress direction to obtain a high-stress product, and the fatigue life, which is a core factor in quality of a coil spring, can be further increased.

Further, according to the method of manufacturing a coil spring using a helicoid reduction mill of the present invention, the coil spring material 10 cooled through the diameter adjustment process and the coiling spring material cutting process is reheated by the second heater 21 to increase the temperature thereof to such a degree that it is decreased, and then the reheated coil spring material 10 is coiled and then rapidly cooled through oil quenching to maintain an austenite structure at room temperature, thereby greatly increasing the strength of the coil spring 24.

Therefore, according to the method of manufacturing a coil spring using a helicoid reduction mill of the present invention, since the winding number of a coil spring 24 can be greatly decreased at the time of manufacturing a coil spring requiring uniform strength, the amount of a coil spring material 10 used is also greatly decreased, so that a light coil spring can be manufactured, with the result that the weight of a vehicle can also be decreased when the manufactured coil spring is used for a vehicle suspension system, thereby decreasing the fuel consumption rate of automobiles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a coil spring using a helicoid reduction mill, comprising the steps of:
    supplying a coil spring material linearly unrolled by a pre-straightener to a surface treatment machine and then shot-blasting or scarfing its outer surface to surface-treat the coil spring material;
    primarily heating the surface-treated coil spring material to a predetermined temperature using a first heater;
    sequentially supplying the primarily-heated coil spring material between upper and lower rollers of a plurality of helicoid reduction mills and then pressurizing it in a stepwise fashion so as to reduce a cross-section of the coil spring material such that the coil spring material has the same diameter as that of a coil spring to be manufactured;
    measuring the diameter of the coil spring material using a diameter measuring machine, measuring the length of the coil spring material using a length measuring machine and then cutting the coil spring material to a desired size;
    secondarily heating the cut coil spring material to a predetermined temperature using a second heater such that a temperature drop of the coil spring material cooled through the cross-section reducing process and the coiling spring material cutting process is compensated for;
    forming the secondarily heated coil spring material into a coil spring using a coiling machine; and
    oil-quenching and then tempering the formed coil spring.

2. The method according to claim 1, wherein the upper and lower rollers of the plurality of helicoid reduction mills are configured such that an angle defined between axes of the upper and lower rollers, which intersect each other on a central axis of the coil spring material, is gradually increased from one end thereof through which the coil spring material is supplied to the other end thereof through which the coil spring material is discharged, so that the coil spring material is pressurized while being rotated based on the central axis of the coil spring material.

3. The method according to claim 2, wherein the upper and lower rollers intersect each other in an X shape such that the upper rollers are rotated counterclockwise based on the central axis of the coil spring material whereas the lower rollers are rotated clockwise based on the central axis of the coil spring material, and thus the coil spring material is pressurized while being rotated clockwise based on the central axis of the coil spring material.

4. The method according to claim 2, wherein the upper and lower rollers intersect each other in an X shape such that the upper rollers are rotated clockwise based on the central axis of the coil spring material whereas the lower rollers are rotated counterclockwise based on the central axis of the coil spring material, and thus the coil spring material is pressurized while being rotated counterclockwise based on the central axis of the coil spring material.

5. The method according to claim 2, wherein, in the steps of primarily and secondarily heating the coil spring material, the coil spring material is heated to a temperature of $A_{C3}$ transformation point or more.

* * * * *